United States Patent [19]

Berkowitz et al.

[11] 3,872,118

[45] Mar. 18, 1975

[54] PREPARATION OF SODIUM DICHLOROISOCYANURATE DIHYDRATE COMPOSITION

[75] Inventors: Sidney Berkowitz, Highland Park; Raymond Mesiah, Somerset, both of N.J.

[73] Assignee: FMC Corporation, New York, N.Y.

[22] Filed: July 18, 1973

[21] Appl. No.: 380,459

[52] U.S. Cl............................................. 260/248 C
[51] Int. Cl............................................. C07d 55/38
[58] Field of Search ................................ 260/248 C

[56] References Cited

UNITED STATES PATENTS

| | | | |
|---|---|---|---|
| 3,270,017 | 8/1966 | Kovalsky et al. | 260/248 |
| 3,835,134 | 9/1974 | Schiessl et al. | 260/248 |

*Primary Examiner*—John M. Ford

[57] ABSTRACT

A sodium dichloroisocyanurate dihydrate-containing composition is prepared by mixing a hydratable salt with an anhydrous or partially hydrated sodium dichloroisocyanurate and effecting controlled hydration of the sodium dichloroisocyanurate to its dihydrate.

6 Claims, No Drawings

PREPARATION OF SODIUM DICHLOROISOCYANURATE DIHYDRATE COMPOSITION

This invention relates to the production of sodium dichloroisocyanurate dihydrate-containing compositions wherein the dihydrate is formed from an anhydrous or partially hydrated dichloroisocyanurate feed material.

Dichloroisocyanurates are well-known materials which are widely used as a source of available chlorine in solid bleaching, sanitizing and detergent compositions. The sodium and potassium salts are the most widely used in laundering compositions because they are very soluble and easily removed by rinsing. The sodium dichloroisocyanurate is known to exist in three forms, namely, the anhydrous form, the monohydrate (containing approximately 7.6% water of hydration by weight), and the dihydrate (containing approximately 14.1% water of hydration by weight). See Symes, U.S. Pat. Nos. 3,035,056 and 3,035,057 of May 15, 1962.

Exemplification of one prior art process for producing sodium dichloroisocyanurate dihydrate is disclosed in U.S. Pat. No. 3,035,056. In this process sodium dichloroisocyanurate dihydrate is produced by the chlorination of trisodiumisocyanurate with gaseous chlorine. Chlorination results in the production of both sodium dichloroisocyanurate dihydrate and sodium chloride. The presence of sodium chloride is undesirable because it interferes with the stability of the dihydrate. In order to remove the sodium chloride, large quantities of water must be added to the reaction mixture. Use of large quantities of water, however, dissolves and decomposes the sodium dichloroisocyanurate and therefore decreases the total amount of product recovered.

Prior art processes have also been concerned with the preparation of stable, free-flowing compositions of dichloroisocyanurate. See Symes, U.S. Pat. No. 3,157,649 and Brown, et al., U.S. Pat. No. 3,293,188. Symes (U.S. Pat. No. 3,157,649) teaches mixing solid particles of potassium dichloroisocyanurate containing less than 0.3% by weight of moisture with solid particles of a compound which is an anhydrous, hydratable, water-soluble, non-deliquesent and crystalline inorganic salt, and heating the mixture at temperatures of about 100° to 150°C. This process produces compositions which are dry mixes of anhydrous potassium dichloroisocyanurate. The process is expensive and time consuming since the patentee must obtain dry potassium dichloroisocyanurate prior to mixing it with the inorganic salt. The patentee employs temperatures above 100° to assure obtaining potassium dichloroisocyanurate in the final composition in its anhydrous state.

Brown, et al., U.S. Pat. No. 3,293,188, teach the preparation of bleaching, sterilizing and disinfecting compositions containing a dichlorocyanurate (in acid or salt form), sodium tripolyphosphate and sodium sulfate. Brown et al teach mixing a dichlorocyanurate with a "synergistic carrier agent mixture" of sodium tripolyphosphate and sodium sulfate decahydrate. This mixture is heated and then cooled to form a slurry or plastic mass, which is then dried at high temperatures, approximately 95°C, and pulverized to form a powdered product with a low bulk density whose water content can vary from 7 to 30%.

Brown, et al.'s, use of high temperatures (95°C) to dry their composition, results in decomposition of the dichlorocyanurate. The decomposition is enhanced by the presence of substantial amounts of water. Decomposition results in lowering the available chlorine content of the product. Use of drying temperatures above 70°C results in a product wherein the dichlorocyanurate component, if sodium dichloroisocyanurate, must be in the anhydrous and/or the monohydrate state.

In addition to the above deficiencies, the prior art products are not thermal-decomposition resistant materials. That is, the anhydrous or monohydrate salts and combinations thereof, undergo progressive decomposition when subjected to an intense source of heat, such as a burning match or cigarette. This decomposition continues until the entire mass is destroyed.

It is the object of our invention to produce a free-flowing, storage-stable, thermal-decomposition resistant product without loss of available chlorine, which product may be processed without drying directly into detergent, bleaching, and disinfecting formulations.

We have discovered that a free-flowing, storage-stable, thermal-decomposition resistant product mixture containing sodium dichloroisocyanurate dihydrate can be prepared from anhydrous or partially hydrated sodium dichloroisocyanurate feed by mixing no more than stoichiometric amounts of a hydrated salt (sufficient to form the sodium dichloroisocyanurate dihydrate) with anhydrous or partially hydrated sodium dichloroisocyanurate, heating this mixture between ambient and 70°C, and maintaining the mixture within this temperature range until the reaction is completed. The reaction is completed when the exotherm subsides. Sodium dichloroisocyanurate dihydrate is produced in nearly quantitative yields in the resultant product mixture.

The hydrated sodium dichloroisocyanurate product produced by our process contains from 11% to 14.1% water of hydration by weight. This product ingredient is sufficiently stable that the product mixture will not undergo progressive, thermally-initiated decomposition when subjected to a source of intense heat, such as a hot wire, burning match or cigarette. More than minimal quantities of free moisture (that is moisture above 14.1% by weight) should be avoided, as excess free moisture tends to make the product sticky and not free-flowing.

Any solid commercially anhydrous sodium dichloroisocyanurate or partially hydrated dichloroisocyanurate which is subject to progressive thermally-initiated decomposition may be used in our invention. Mixtures containing different amounts of anhydrous and hydrated sodium dichloroisocyanurate are advantageous since these mixtures are readily prepared by conventional methods. The sodium dichloroisocyanurate which is used as the feed contains less than 11% water of hydration by weight.

Any salt which is a hydrated salt may be employed in our invention. The hydrated salt should be chemically and physically compatible with sodium dichloroisocyanurate to prevent loss of available chlorine. The salt should contain waters of hydration with numbers between 4 and 24, preferably 6 to 12. The larger the number of waters of hydration, the more sodium dichloroisocyanurate dihydrate can be produced per mole of hydrated salt. The hydrated salt should have a melting point, at which it yields waters of hydration, not above about 70°C. Temperatures above 70°C will decompose sodium dichloroisocyanurate dihydrate to its corresponding monohydrated salt.

Typical hydrated salts, given by way of illustration, which may be used in our process include sodium sulfate decahydrate, sodium sulfate heptahydrate, sodium carbonate decahydrate (washing soda), sodium carbonate heptahydrate, sodium tetraborate decahydrate (borax), sodium orthophosphate heptahydrate, sodium orthophosphate dodecahydrate.

The hydrated salt should be employed with sodium dichloroisocyanurate in amounts not greater than the stoichiometric amounts of the hydrated salt necessary to form the dihydrate of sodium dichloroisocyanurate. Waters of hydration in excess of stoichiometric amounts will dissolve and decompose the sodium dichloroisocyanurate resulting in a product with decreased available chlorine content which is sticky and not free-flowing. Use of hydrated salt in amounts less than stoichiometric may produce the desired product if the resulting sodium dichloroisocyanurate hydrate contains over 11% water.

Hydration of sodium dichloroisocyanurate is an exothermic reaction. The reaction temperature should be properly controlled to prevent the eventual decomposition of the reaction mass. Any controlled method which keeps the mixture at a temperature below the decomposition point can be used. The maximum temperature for operation without any substantial decomposition is 70°C. Any temperature above the freezing point of water which melts the hydrated salt to yield water of hydration is operable, although temperatures below ambient are uneconomic. Consequently, temperatures between ambient and 70°C may be employed. We prefer to operate at temperatures between 40°C and 50°C.

Heating is required to initiate melting of the hydrated salt and hydration of the sodium dichloroisocyanurate. After this initial start-up, the heating source may be completely or partially removed since the heat evolved from the exothermic reaction is sufficient to continue the reaction until completion. Temperature control of the exothermic reaction, e.g., by conventional cooling means, can be eased once hydration is complete. The reaction is complete when the exotherm subsides. When the reaction is completed, the product may either be cooled to ambient temperature and recovered or recovered as a hot material. Cooling may be achieved by conventional means for cooling reaction products.

The reaction materials are mechanically agitated until the components are substantially uniformly mixed. Mixing may be performed prior to and/or during heating. Mixing prevents localization of the hydratable water in the mixture thus allowing for the formation of a free-flowing product. Mixing also facilitates rapid and uniform hydration of the sodium dichloroisocyanurate. Any conventional apparatus may be employed to mechanically mix the mixtures, such as a Patterson-Kelly Blender.

The hydrated salt is preferably blended in solid form. The size of the solid hydrated salt may vary. However, it is more efficient to employ crushed hydrated salt (−10, +150 mesh) since more waters of hydration will be given off per unit of time than with uncrushed salt. The sodium dichloroisocyanurate feed material may be in powder, pellet, or granular form.

As indicated above, the sodium dichloroisocyanurate component is hydrated to the point where the product mixture does not undergo thermally-initiated decomposition. Such a component contains an average water content of at least 11% by weight in the form of water of crystallization. This component, containing at least 11% water, contains substantial amounts of sodium dichloroisocyanurate dihydrate although some sodium dichloroisocyanurate having less than two waters of hydration may be mixed with the dihydrate. The product may contain up to 14.1% water as water of hydration by weight.

The following examples illustrate the preparation and properties of sodium dichloroisocyanurate dihydrate produced by our process. These examples are given by way of illustration, and not by way of limitation. All percentages are based upon weight unless otherwise specified.

EXAMPLE 1-A

Process of the Invention 32.2 grams (0.1 mole) of sodium sulfate decahydrate was dry blended with 110 grams (0.5 mole) of anhydrous sodium dichloroisocyanurate in a Patterson-Kelly Blender at 26°C. This blended mixture was heated slowly to 32°C. At 32°C the reaction became exothermic and the temperature rapidly rose to 53°C where the temperature was maintained by a water cooled heat exchanger until the exotherm subsided; the reaction required 15 minutes. The reaction product was cooled to room temperature and was analyzed. The cooled product was free-flowing, weighed 142.2 grams and assayed 49.7% available chlorine, theory 49.86%. X-ray defraction patterns indicated the product contained substantial amounts of sodium dichloroisocyanurate dihydrate with minor amounts of anhydrous sodium sulfate. All of the sodium dichloroisocyanurate salt was in the form of its dihydrate.

EXAMPLE 1-B

Comparative Process 32.2 grams (0.226 moles) of anhydrous sodium sulfate was dry blended with 110 grams (0.5 moles) of anhydrous sodium dichloroisocyanurate in a Patterson-Kelly Blender for 15 minutes at room temperature. The product analyzed 49.7% available chlorine, theory 49.86%. X-ray defraction patterns indicated that the product mixture did not contain any sodium dichloroisocyanurate dihydrate.

EXAMPLE 2

Process of the Invention 3.81 grams (0.1 moles) of sodium tetraborate decahydrate was dry blended with 88.0 grams (0.4 moles) of anhydrous sodium dichloroisocyanurate in a Patterson-Kelly Blender at 25°C. This blended mixture was heated to 60°C while blending. The mixture was held at 60°C for 60 minutes and was then slowly cooled to room temperature and analyzed. The product was free-flowing and assayed 45.3% available chlorine, theory 45.5%. X-ray defraction patterns indicated the product contained substantial amounts of sodium dichloroisocyanurate dihydrate with minor amounts of sodium-tetraborate dihydrate. All of the sodium dichloroisocyanurate salt was in the form of its dihydrate.

EXAMPLE 3

The products of Example 1 were tested for thermal decomposition rates. These materials were tested by embedding on 18 gage nichrome wire in a 25 gram sample. A current was passed through the wire for several seconds, until the material in contact with the wire decomposed. The current was then turned off and the decomposition was observed to determine the tendency for self-propagation. The results are listed in Table I.

TABLE I

| Example | Decomposition Rate |
| --- | --- |
| 1-A | Incomplete - decomposition stopped when current shut off |
| 1-B | Complete & rapid |

This example demonstrates that the products of this invention will not undergo progressive, thermally-initiated self propagation.

The invention thus being described, it will be obvious that the same may be varied in many ways. Such variations are not to be regarded as a departure from the spirit and scope of the invention, and all such modifications are intended to be included within the scope of the following claims.

What is claimed is:

1. A process for producing a free-flowing, storage-stable, thermal-decomposition resistant sodium dichloroisocyanurate-containing product which comprises mixing sodium dichloroisocyanurate containing less than about 11% by weight water of hydration, and no more than stoichiometric amounts of a hydrated salt that will react to convert the sodium dichloroisocyanurate to its dihydrate, heating the mixture from ambient temperature to 70°C to obtain an exothermic reaction, maintaining the temperature between ambient and 70°C until the exothermic reaction subsides, and recovering a product mixture of sodium dichloroisocyanurate containing from 11% to 14.1% by weight water of hydration and the residue of the hydrated salt.

2. The process of claim 1 wherein the hydrated salt contains 6 to 12 waters of hydration.

3. The process of claim 1 wherein the hydrated salt is selected from the group consisting of sodium sulfate decahydrate, sodium tetraborate decahydrate and sodium carbonate decahydrate.

4. The process of claim 1 wherein the mixture is heated and maintained between 40° and 50°C.

5. The process of claim 1 wherein stoichiometric amounts of hydrated salt are used in the mixture.

6. The process of claim 1 wherein the reaction mass is cooled to ambient temperature after the exothermic reaction and prior to recovering said sodium dichloroisocyanurate-containing product.

* * * * *